March 8, 1932.   F. LEISTER   1,848,427
HINGE
Filed July 6, 1929
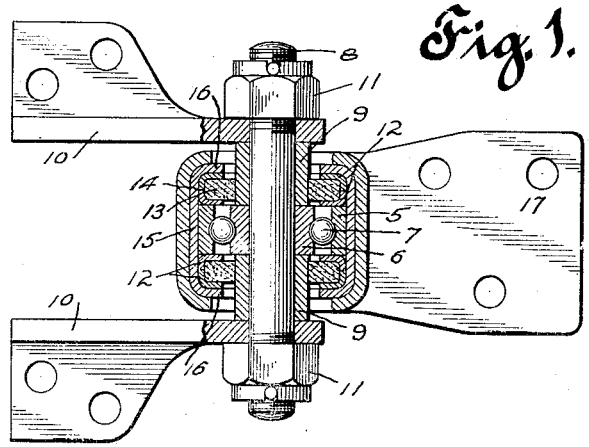
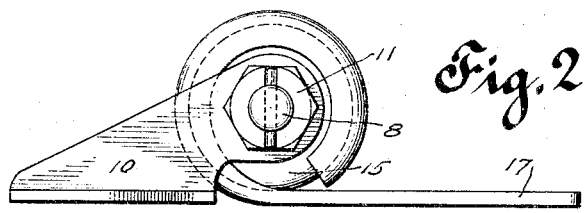
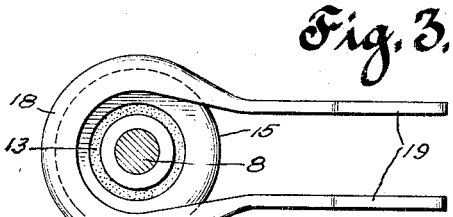
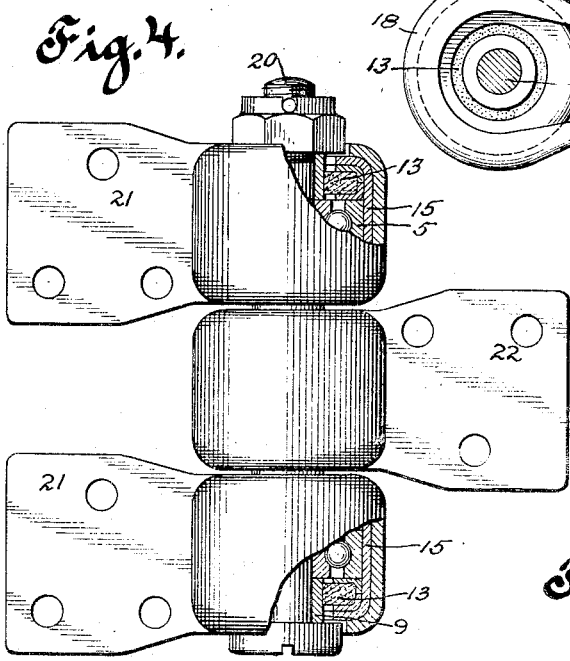
INVENTOR
Fayette Leister
BY
ATTORNEYS Patented Mar. 8, 1932

1,848,427

UNITED STATES PATENT OFFICE

FAYETTE LEISTER, OF NEW BRITAIN, CONNECTICUT, ASSIGNOR TO THE FAFNIR BEARING COMPANY, OF NEW BRITAIN, CONNECTICUT, A CORPORATION OF CONNECTICUT

HINGE

Application filed July 6, 1929. Serial No. 376,402.

My invention relates to an antifriction device particularly, though not exclusively adapted for an aileron or rudder hinge.

It is the general object of the invention to provide an antifriction bearing device particularly applicable to a hinge and one which will retain lubricant and exclude dirt and dust for long periods, and which is relatively cheap to manufacture and easy to apply.

Other objects and features of the invention will be hereinafter indicated or will become apparent upon a reading of the specification taken in connection with the drawings.

In the drawings which show, for illustrative purposes only, preferred embodiments of the invention—

Fig. 1 is a central sectional view through a hinge and illustrating features of the invention;

Fig. 2 is a view in side elevation of the hinge shown in Fig. 1;

Fig. 3 is a view similar to Fig. 2 illustrating a slight modification, parts being broken away to illustrate certain features;

Fig. 4 is a plan view of a slightly modified type of hinge, parts being broken away to illustrate interior construction.

The invention contemplates the use of a novel antifriction bearing unit in a hinge construction, and as herein specifically shown, 5 indicates an outer bearing ring, while 6 indicates a complementary inner bearing ring, and antifriction members such as balls 7 are interposed between the bearing rings. The rings 5 and 6 may be grooved for receiving the balls 7 so that the rings are unitarily held by the balls 7.

The inner ring may be held upon a through bolt 8 fitting the bore of the ring 6 and held thereon laterally as by means of spacer sleeves 9—9. In the specific embodiment shown in Fig. 1, hinge members or straps 10—10 are provided with eyes to fit over the ends of the bolt 8, and nuts 11—11 serve to hold the hinge straps 10—10, the spacer sleeves 9—9, and the inner ring 6 in unitary relationship.

At each side of the bearing is a sealing means for excluding dust and dirt and retaining lubricant on the bearing surfaces. The sealing means will be carried with one of the rings, preferably the outer, as illustrated in the drawings. Each sealing ring may include a radially inwardly opening annular cup member which may be formed of laterally separable parts 12—12. A sealing ring 13 of felt or the like fits between the separable parts 12—12 and is held in each cup member. The cup member parts 12—12 are preferably formed of sheet metal and abut each other as indicated at 14 so that when assembled they are substantially rigid. The cup members may directly abut the side edges of the outer ring 5 and are retained in unitary relation with the outer ring as by means of a sheet metal sleeve 15 enveloping the outer ring 5 and the cup members at opposite sides thereof. The sleeve 15 is provided with beaded over flanges 16—16 at opposite ends engaging over the sides of the cup members so that the sleeve seals the cup members and outer ring together as a unit. A second hinge member such as the strap 17 may extend substantially completely around and embrace the sleeve 15 and parts held thereby as shown in Figs. 1 and 2.

In the form shown in Fig. 3, the hinge element corresponding to the strap 17 is formed with an embracing portion 18 and two strap portions 19 which may fit upon opposite sides of the element to which the hinge is to be secured.

In that form of the invention shown in Fig. 4 the various bearing elements may be of substantially the same construction as those hereinbefore described in connection with Fig. 1. As shown in Fig. 4, the through bolt 20 corresponding in general to the through bolt 8 hereinbefore mentioned is not itself secured to the hinge straps, but is in effect floating. As there shown, there are three ball bearing units which may be of substantially the same construction as those shown in Fig. 1, and each bearing, or more properly, the sleeve 15, when such sleeves are employed, is embraced by or secured to straps 21—21 to be secured to members to be hinged. With three bearing units, the middle bearing may be secured to one strap 22 to be secured to one member to be hinged while the end bearing units are secured to straps to be secured to the other member to be hinged. Obviously, the number of bearings employed may be increased or decreased in accordance with the requirements.

It will be seen that I have provided a very sturdy antifriction type of hinge which will be effectively sealed against entry of dirt and dust and which will retain lubricant for long periods. The sealing ring means, including the felt ring 13 and cup member 12 are preferably carried as a unit with the outer bearing ring, while the inner surface of the felt ring 13 engages a part movable with the inner ring or even the inner ring itself so that the space between the two rings will be well sealed.

While I have indicated preferred forms of hinge elements I do not wish to be limited to the specific forms shown. It is however preferable to have the hinge member which engages the outer bearing ring so formed as to substantially embrace the latter to give adequate support and rigidity. That portion of the hinge strap or member which is secured to one of the members to be hinged may have a single strap as shown in Figs. 1 and 2, or may have two strap portions as 19 shown in Fig. 3, and, of course, may be made in various other ways.

While the invention has been described in considerable detail and different embodiments shown, it is to be understood that various other modifications and changes may be made to suit varying conditions without departing from the invention as defined in the appended claims.

I claim:

1. In a hinge construction of the character indicated, an outer bearing ring, an inner bearing ring, anti-friction bearing members interposed between said bearing rings, cup means abutting the faces of said outer bearing ring, a yielding sealing ring seated in each of said cup means, a sleeve surrounding said outer bearing ring and said cup means in unitary relationship, carrying means for holding the assembled parts, hinge members connected to the ends of said carrying means and a hinge strap member secured to said sleeve.

2. In a hinge construction of the character indicated, an outer bearing ring, an inner bearing ring, anti-friction bearing members interposed between said bearing rings, ring-shaped members abutting the faces of said outer bearing ring, each of said ring-shaped members having a circumferential groove in the inner surface thereof, a yielding sealing ring seated in each of said grooves, a sleeve surrounding said outer bearing ring and said ring-shaped members for holding said outer bearing ring and said ring-shaped members in unitary relationship, carrying means for holding the assembled parts, hinge members connected to the ends of said carrying means and a hinge strap member secured to said sleeve.

3. In a hinge construction of the character indicated, an outer bearing ring, an inner bearing ring, anti-friction bearing members interposed between said bearing rings, cup means each carrying a sealing ring abutting the faces of said outer bearing ring, carrying means for holding the assembled parts, hinge members connected to the ends of said carrying means and a strap member embracing the said assembled parts.

FAYETTE LEISTER.